United States Patent [19]
Butler, Jr. et al.

[11] 3,760,524
[45] Sept. 25, 1973

[54] FISHING LINE GUIDE FASTENING AND METHOD OF SECURING A FISHING LINE GUIDE

[75] Inventors: James Oscar Butler, Jr., Columbia; Bob G. Shepherd, West Columbia, both of S.C.

[73] Assignee: Columbia Products Company, Columbia, S.C.

[22] Filed: Mar. 7, 1972

[21] Appl. No.: 232,431

[52] U.S. Cl. ................ 43/24, 156/165, 156/215, 156/217
[51] Int. Cl. ............................................ A01k 87/04
[58] Field of Search ............... 43/24; 156/86, 160, 156/165, 215, 217

[56] References Cited
UNITED STATES PATENTS 2,221,421  11/1940  Curry .......................... 156/215 X
2,511,421  6/1950  Werner ......................... 156/217 X
3,400,481  9/1968  Christenson ....................... 43/24

Primary Examiner—Louis G. Mancene
Assistant Examiner—Daniel J. Leach
Attorney—Francis T. Carr et al.

[57] ABSTRACT

A strip of resinated tape is disposed about each foot of the fishing line guide along with an overlying plastic film strip. The tape and film strip are tightly wrapped about each foot and the fishing rod blank as the ends are held by a clamp. The resinated tape is then cured. Thereafter the plastic film is removed and the ends of the tape are trimmed to leave a joint where the ends of the tape join together. The resintated tape can be provided with a decorative representation such as stripes.

19 Claims, 10 Drawing Figures

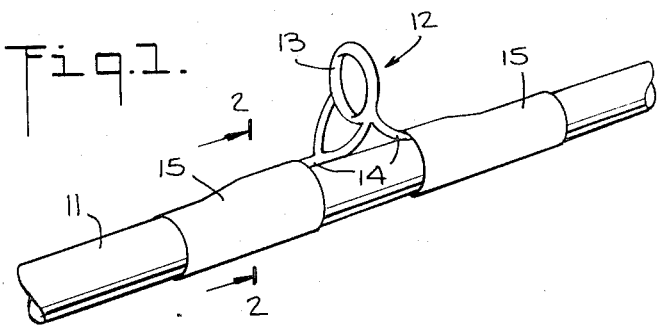
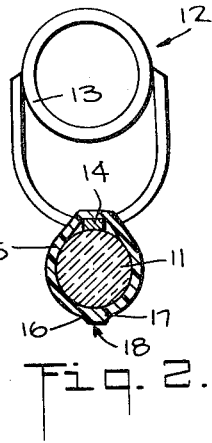
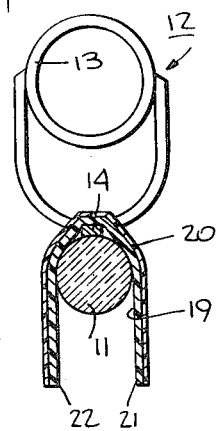
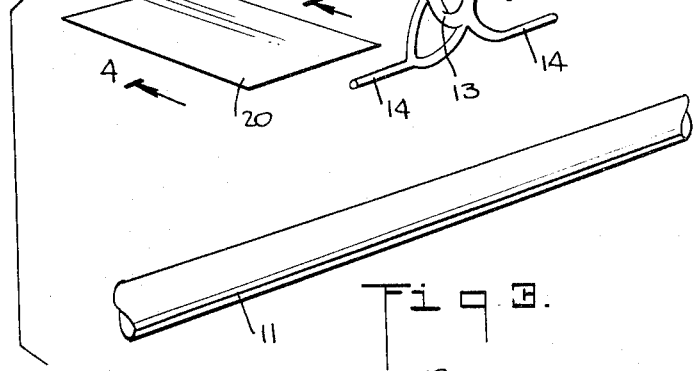
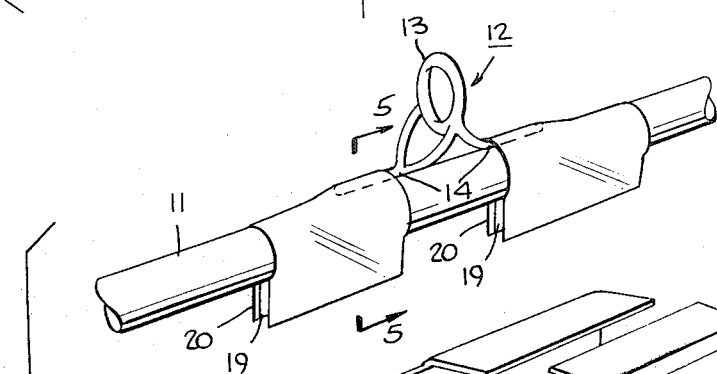
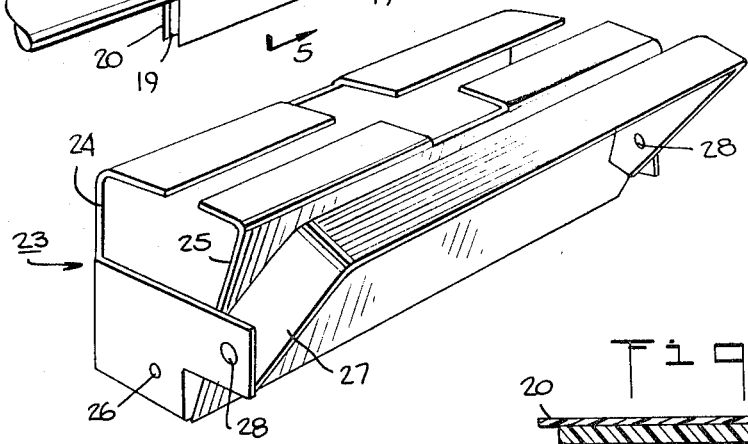

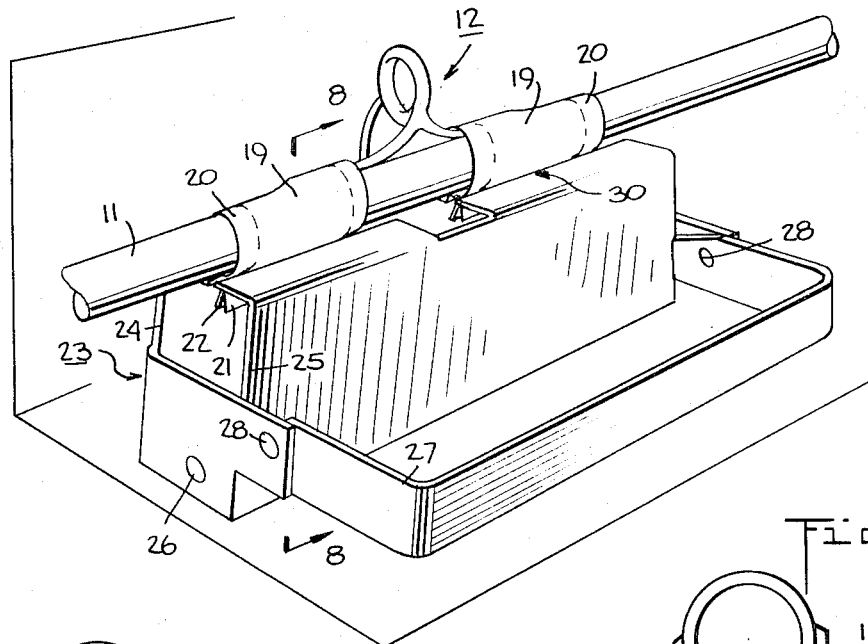
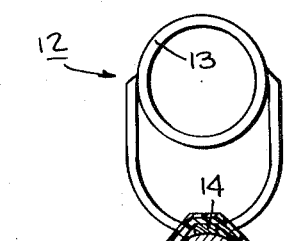
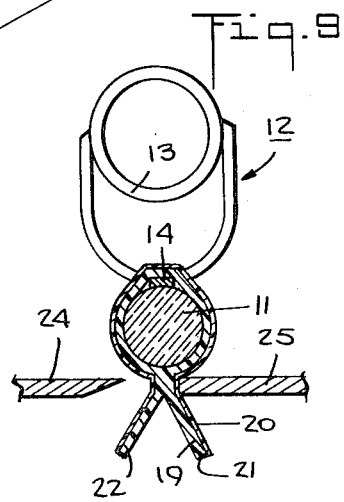
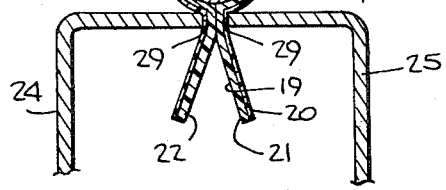
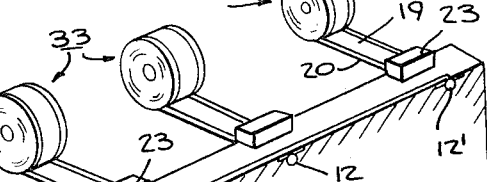
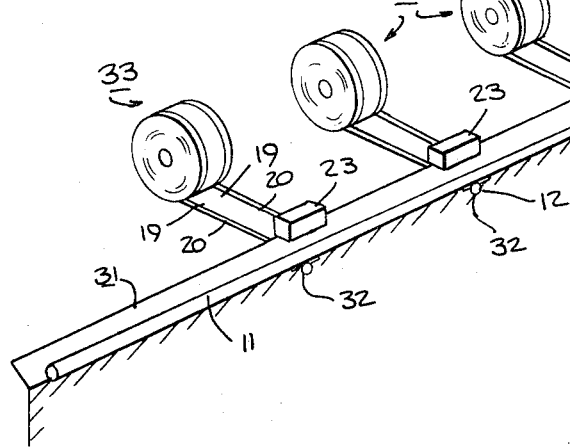

FISHING LINE GUIDE FASTENING AND METHOD OF SECURING A FISHING LINE GUIDE

This invention relates to a fishing line guide fastening and a method of securing a fishing line guide to a fishing rod blank.

Heretofore, a number of methods have been known for securing fishing line guides to fishing rods and rod blanks. In some instances, it has been known to secure the fishing line guides by means of integral tabs on the guides which are clamped about the rod to form a mechanical connection. However, this type of fastening has not been aesthetically pleasing to the average fisherman. In other instances, it has been customary to provide the guides with integral feet and to secure the guides by means of helical wrappings or windings of thread placed over the feet of the guides and around the rod. However, this wound type of fastening has generally required time consuming and expensive operations. Further, even after the winding is complete with the thread ends tucked under the starting and finishing turns, it has been necessary to apply a lacquer or an adhesive type of coating in one or more applications to bind the turns, to give the fastening a smooth finish and to prevent the turns from ravelling in the event that one or more are cut during use.

It has also been known to use cylindrical sleeves to retain, fasten or secure the guides to a fishing rod. Such sleeves have been made of various materials including metal, braided material and heat shrinkable plastic tubing. However, during assembly, these sleeves have to be slipped on or assembled over the small end of the fishing rod. This is not only difficult to do automatically by a machine but also, should any inner guide fastening require replacing, all of the guides between the affected one and the end of the rod would have to be removed to allow the replacement sleeve to be assembled.

Further, in the case of a metal sleeve or a plastic sleeve strong enough to accomplish the purposes intended, such will markedly stiffen the fishing rod and change the action of the rod in use. Additionally, should the metal sleeve be assembled by being contracted or shrunk onto the rod, such may produce what is generally called a "stress raiser" and cause the rod to break at that point due to the concentration of stresses and the continual stressing of the rod as it is used in fishing. Also, in the case of metal sleeves, there is a tendency during the assembly operation to scratch or score the fishing rod. This can be of concern where the rod is made of a material such as a glass fiber reinforced plastic. In the case of a braided sleeve, the ends of the sleeve have not had selvages. As a result, the ends become ragged and rough in use and require replacing within a relatively short period of time. In the case of the heat shrinkable plastic tubing, there is a possibility that the final elastic strength of the plastic sleeve is not sufficient to provide proper fastening for the guide.

It has also been known to use strips of cloth made of heat shrinkable fibers such as nylon to secure a fishing line guide on a rod. These strips have generally been wrapped a number of times about the guide foot and the rod and a heat shrinkable material, such as cellophane, has been wound about the strip to tightly bond the strip to the surface of the rod. The strip has then been heat treated to cure the resin of the strip while shrinking the fibers tautly about the rod. Such fastenings have, however, required specific heat shrinkable materials and temperatures in order to effect a satisfactory securement. Also, these fastenings have required a relatively large amount of material due to the need to have a plurality of wraps of the strip about the guide and rod. Still further, there is a need to ensure that the windings of cloth and heat shrinkable cellophane material are maintained in place during the curing and shrinking operations.

Accordingly, it is an object of this invention to provide a fishing line guide fastening which can be easily applied.

It is another object of the invention to provide a fishing line guide fastening which can be applied circumferentially about a fishing rod independently of other fastenings.

It is another object of the invention to securely hold a fishing line guide in place by a fastening securely mounted on the fishing rod.

It is another object of the invention to provide a fastening for a fishing line guide which provides an attractive appearance.

It is another object of the invention to provide a fishing line guide fastening which requires a minimum of material.

It is another object of the invention to provide a low cost fastening which is capable of fast production and reasonable durability under normal use.

It is another object of the invention to provide a method of quickly and easily securing fishing line guides in place on a fishing rod or rod blank.

It is another object of the invention to provide a method of securing fishing line guides to a rod blank in an automated manner.

It is another object of the invention to provide a method of securing a fishing line guide to a fishing rod without the need for heat shrinkable materials.

Briefly, the invention provides a method of securing a fishing line guide having projecting feet to a fishing rod or rod blank as well as a fastening produced thereby.

The method comprises the step of initially wrapping a resinated cloth tape and an overlying plastic film strip over each foot of the fishing line guide and the rod blank on which the guide is mounted with the ends of the tape and film strip projecting from the blank. Thereafter, the ends of the tape and the film strip are brought together by a suitable clamp or clip under a clamping force which imposes a sufficient tension on the tape and film strip portions encircling the foot and rod blank so as to press these portions against the foot and rod blank. Next, while still under tension, the tape is cured under a suitable heat curing operation so as to secure the tape to the rod blank and the abutting ends of the tape to each other. Any suitable means of applying heat can be used for curing purposes depending on the amount of cure required and the type of substance used for impregnation. Subsequently, the film strip is removed and the projecting ends of the tape are trimmed from the portions encircling the foot and rod blank leaving a joint in the tape formed by the remaining ends thereof. After trimming of the tape, the entire rod, guides, fastenings and all are coated with a varnish by means of a dipping operation.

The tape is of any suitable material such as a cotton and polyester woven fabric containing cotton filler and polyester warp. In addition, any other suitable material can be used such as a glass fiber tape and a polyester tape. Also, the tape is initially impregnated with a suitable resin such as a polyester resin, or in cases where more strength is required, an epoxy resin or any like substance. The impregnation is carried out, for example, by running the tape through a liquid solution and then either drying or partially curing the tape to a B stage to permit easily handling and application.

In addition, an interleaving or release layer formed by a plastic film strip is applied over the tape and the tape and strip are wound up into a roll. The release strip is sized with a greater width than the tape and serves to prevent bonding of the tape during curing to the clamp used to hold the ends of the tape together and to form a mold for the tape during curing. This effects firmness and neatness of the finished guide tapes and controls the amount of overflow.

The invention also provides a fastening for securing a fishing line guide having at least one foot extending therefrom to a fishing rod blank. This fastening comprises a resinated tape which is disposed circumferentially about the rod blank and over the foot of the line guide under tension, is adhesively secured to the rod blank, and has a pair of ends bonded to each other along a joint extending along the rod blank. The tape is also made of a non-heat shrink material and is heat cured to bond to the rod blank so as to hold the guide on the rod blank. Also, the tape is of a length to encircle the guide foot and rod blank and to provide short projecting ends which can be securely clamped together. As a result, the amount of material used for the tape is a relative minimum. Thus, the overall costs of providing material for fishing rods, each of which has a number of guides thereon, can be significantly reduced.

The means for clamping the ends of the resinated tape together prior to curing can be of any suitable construction, such as a clamp or a metal clip which can also be removed after completion of the curing cycle and reused. Further, the fishing line guides can be held in place or preset by mechanical means to aid in the application of the clamping means so that the tape is pressed firmly against the rod blank.

The invention thus provides a technique by which a more or less automatic and economical assembly of fishing line guides on a fishing rod or rod blank can be made. For example, a number of guides of the same or varying sizes can be placed by hand in locating nests in a suitable machine. As many clamps as the number of guides are then placed in the machine. Next, the rod blade is placed on top of the guides, a button is pushed and then the machine feeds off cutoff lengths of the resinated cloth and plastic film strips, wraps them tightly around each foot of the guide and the rod, and tightens the clamps which hold the cloth tapes and film strips in place, all in one operation. The rod with the guides, cloth tapes, plastic films and clamps is then removed and placed in a conveyor oven to cure the resin in the cloth tape. After curing is complete, the clamps are removed and a special machine removes the plastic film and clips off the excess ends of the tape. Thus, a type of semi-automation is achieved. This results in a reduced cost of manufacture and, as a result, in a reduced selling price to a customer.

The fastening is characterized in providing a substantially smooth surface appearance which can be enhanced by providing the tape with various decorative representations such as stripes, designs, colors and the like. Further, since the fastening which is bonded to the rod blank is of a cloth material, there is no danger that such a material would adversely effect the feel of the rod during use or would adversely effect the finish of the rod, such as by scrapping or scoring during assembly. Also, a "stress raiser" condition is avoided. Further, since the cloth tapes are applied in strip form, should any guide require replacement, only that guide need to be removed from the fishing rod.

These and other objects and advantages of the invention will become more apparent from the following detailed description and appended claims taken in conjunction with the accompanying drawings in which:

FIG. 1 illstrates a perspective view of a line guide secured to a fishing rod by a pair of fastenings according to the invention;

FIG. 2 illustrates a view taken on line 2—2 of FIG. 1;

FIG. 3 illustrates an exploded view of the structure of FIG. 1;

FIG. 4 illustrates a view taken on line 4—4 of FIG. 3;

FIG. 5 illustrates a view taken on line 5—5 of FIG. 6;

FIG. 6 illustrates an exploded view of a clamping means used in conjunction with the tapes of the fastening means according to the invention;

FIG. 7 illustrates a view similar to FIG. 6 with the projecting ends of the cloth tapes clamped together;

FIG. 8 illustrates a view taken on line 8—8 of FIG. 7;

FIG. 9 illustrates a view similar to FIG. 8 with the clamp in opened position; and FIG. 10 illustrates a fragmentary view of the machine used to secure a plurality of fishing line guides to a fishing rod blank.

Referring to FIGS. 1 and 2, the fishing rod blank 11 is provided with a plurality of fishing line guides 12, only one of which is shown for clarity. Each fishing line guide 12 includes an eyelet 13 and a pair of feet 14, each of which extends from the eyelet 13 in a known manner. Each foot 14 of the guide 12 has an elongated section which extends parallel to the axis of the rod blank 11. In addition, each line guide 12 is secured to the rod blank 11 by a pair of fasteners or fastenings 15.

Each fastener 15 is formed of a resinated tape which encircles a foot 14 of the line guide 12 and the circumferential periphery of the rod blank 11. The ends 16, 17 of the tape 15 are bonded together to form a joint 18 which also extends along the rod blank 11 parallel to the axis of the blank 11. The joint 18 is disposed at a point diametrically opposite the foot 14 of the line guide 12 about which the tape 15 is disposed.

The resinated tape 15 is formed of a non-heat shrink material which is impregnated with a suitable heat curable resin. For example, the tape 15 is made of a cloth woven of cotton fill threads and polyester warp threads. The tape 15 can also be made of polyester woven material, glass fiber cloth, and the like. The resin is of any suitable heat curable type, such as a polyester resin or an epoxy resin, and serves to bond the tape 15 to the rod blank 11 so as to fixedly secure the line guide 12 in place.

Each fastener 15 is secured to the rod blank 11 in the same fashion and thus only the method of securing one will be discussed below.

Referring to FIGS. 3 and 5, the rod blank 11 which is made of any suitable material such as a glass fiber reinforced plastic rod having a cylindrical or tapered surface is provided with a line guide 12, for example, of corrosion resistant material. The line guide 12 is placed on the rod blank 11 with the feet 14 thereof disposed in parallel relationship to the axis of the rod blank 11. Thereafter, two strips 19 of resinated tape are disposed about the guide feet 14 and the rod blank 11.

As shown in FIG. 4, each strip 19 of resinated tape carries a release layer 20 of a plastic film strip which is of wider dimension than the resinated tape strip 19. The resinated tape strip 19 and film strip layer 20 can be supplied from any suitable source, such as a roll of the two materials from which a suitable length is severed.

As shown in FIG. 5, the resinated tape strip 19 is of a length longer than one revolution of wrap and less than two revolutions of wrap about the line guide foot 14 and rod blank 11. That is, the length is sufficient to permit the tape strip 19 to lay over the foot 14 of the line guide 12 and the rod blank 11 while leaving a pair of ends 21, 22 which extend from the rod blank 11.

Referring to FIG. 6, a suitable clamp means 23 is provided to bring the projecting ends 21, 22 of the resinated tape strip 19 and the film strip layer 20 together so as to have the tape strip substantially completely encircle the foot 14 and rod blank while, at the same time, tensioning the tape strip portions about the foot 14 and rod blank 11. This clamp means 23 is constructed, for example, with a pair of jaws 24, 25 which are pivotally mounted with respect to each other by suitable pivot pins 26 and an actuating lever 27 which is pivotally mounted by pins 28 on one jaw 24 to pivot the jaws 24, 25 relative to each other. The jaws 24, 25 are articulated so as to receive the projecting ends 21, 22 of the resinated tape strip 19 and plastic film strip layer 20 when in an open condition.

Referring to FIGS. 7 and 8, when in the closed position, the jaws 24, 25 of the clamp means 23 grip the projecting ends 21, 22 of the resinated tape strip 19 and plastic film strip layer 20 therebetween at a point as close as possible to the rod blank 11. As shown, each jaw 24, 25 of the clamp means is provided with a pair of clamping areas 29, 30. The opposed clamping areas 29, 30 cooperate with each other to secure each strip 19 of resinated tape therebetween for the respective fasteners 15 of the line guide. The clamping action is such that the portions of the resinated tape encircling the rod blank 11 are caused to contact substantially all of the surface portion of the rod blank 11 where the projecting ends 21, 22 of the tape strip 19 come together while imparting tension to the tape portions which encircle the foot 14 and rod blank 11.

After the strips of resinated tape and plastic film have been clamped within the clamp means 23, the entire unit including the clamp means 23, resinated strips 19, film layers 20, rod blank 11 and line guide 12 is placed within a suitable curing means such as a curing oven (not shown). The oven is then brought to a suitable temperature to cure the resin within the tape strips 19. For example, the curing cycle is 240°F for 45 minutes. This serves to bond the portions of the resinated tape strip 19 encircling the rod blank 11 directly to the rod blank 11 while also securing the clamped portions of the tape strip 19 to each other as shown in FIGS. 8 and 9. After curing, the unit is removed from the curing oven and the jaws 24, 25 of the clamp means 23 open as shown in FIG. 9. The rod blank 11 with the line guide 12 secured thereon is then removed from the clamp means 23. Next, the plastic film strip layer 20 is removed and the extending ends of the resinated tape strip 19 are trimmed at a point close to the rod blank 11 so that a small joint 18 is formed where the ends 16, 17 of the tape 15 are bonded together (see FIG. 2).

It is noted that the plastic film layer 20 serves to prevent bonding of the resinated tape strip 19 to the jaws 24, 25 of the clamp means 23 during curing. Furthermore, the excess width of the layer 20 relative to the tape strip 19 allows this layer 20 to act as a mold for the resinated tape strip 19 during curing. Also, the excess width prevents any overflow of the resin within the resinated tape strip 19 during curing.

Referring to FIG. 10, any suitable machine may be used to secure a plurality of fishing line guides 12 to a rod blank 11. For example, a machine 31 having a plurality of aligned locating nests 32 is provided into which the line guides 12 can be initially placed by hand. Next, a number of clamps 23 corresponding to the number of guides 12 are placed in the machine 31. Thereafter, a rod blank 11 is placed on top of the aligned guides 12 and the machine 31 is actuated to feed out cut off lengths of the resinated tape strip and plastic film strip layer from rolls 33 placed along the machine 31. These lengths are then wrapped tightly about the rod blank 11 and each foot of the guides 12 is clamped within the respective clamp 23 as described above. The rod blank 11 with the guides 12, resinated tape strips, plastic film layers and clamps 23 is then removed from the machine 31 and placed in a conveyor oven to cure the resin in the tape. After curing is complete, the clamp 23 is removed and another machine is used to remove the plastic film strip layers and clip off the excess ends of the tape strips. It is to be noted that any suitable line guide having a foot portion can be secured to a rod or rod blank according to the invention. For example, as shown in FIG. 10, the line guide 12' which is provided near the tip end of the rod blank may have a single foot thereon. In such a case, only one fastening is used. In addition, where extra strength is required in the fastening, a double thickness or two-ply of resinated tape can be used.

The invention thus provides a fastening for positively securing line guides to a fishing rod or rod blank. The fastening is formed of a suitable material which does not require heat shrinking in order to securely fasten the line guide to the rod blank. Furthermore, as the fastening is made from strips of material, the strips can be easily applied in a rapid manner about the line guides and rod blank without the need of being slid over the end of the rod blank as would be the case with a sleeve of material. Still further, as the length of the resinated tape is only as long as that required to provide two ends for clamping within the clamp means, a minimum amount of material is used for the fastening. In this respect, one width of resinated tape can be used of all sizes of line guides and rods or rod blanks as only the desired length of material need be severed from a roll of material.

The invention further provides a fastening which has a substantially smooth outer circumference so that the finished fishing rod has a pleasing aesthetic appearance. Furthermore, the resinated tape can be made to impart a decorative representation, for example, the tape can be provided with stripes, or other designs, of color and can be of any suitable color.

The invention further provides a fastening which does not inhibit the feel of a fishing rod and does not impart any "stress raiser" to the rod.

Finally, the invention provides a means of producing a more economical fishing rod by reducing the costs of securing line guides thereto.

What is claimed is:

1. In combination with a fishing rod blank at least one fishing line guide having at least one foot extending therefrom, and a resinated tape having a pair of ends bonded to each other along a joint extending along said rod blank, said tape being disposed circumferentially about said rod blank and over said foot under tension and being adhesively secured to said rod blank to hold said line guide on said rod blank.

2. The combination as set forth in claim 1 which further comprises a plastic film strip disposed about said tape.

3. The combination as set forth in claim 1 wherein said tape is of a length between said ends substantially equal to the circumference of said rod blank thereat.

4. The combination as set forth in claim 1 wherein said tape is made of non-heat shrink material.

5. The combination as set forth in claim 1 wherein said tape is a woven cloth of cotton threads and polyester threads.

6. The combination as set forth in claim 1 wherein said tape is impregnated with a resin selected from the group consisting of polyester resin and epoxy resin.

7. The combination as set forth in claim 1 wherein said tape is heat cured.

8. The combination as set forth in claim 1 wherein said tape is formed of a material selected from the group consisting of polyester spun thread and glass fiber.

9. The combination as set forth in claim 1 wherein said joint is diametrically opposite said foot.

10. In combination with a fishing rod blank;
at least one fishing line guide having at least one foot extending therefrom,
a strip of resin impregnated tape cured to a "B" stage and disposed about said foot and said rod blank, said strip having a pair of ends disposed adjacent each other, and
means for clamping said ends together to impart tension to said strip.

11. The combination as set forth in claim 10 which further comprises a release film strip about said tape between said tape and said means for forming a mold for said tape during curing.

12. The combination as set forth in claim 10 wherein said tape has a decorative representation thereon.

13. A method of securing a fishing line guide having at least one foot thereon to a fishing rod blank comprising the steps of
wrapping a resinated cloth tape with a plastic film strip thereover about the foot and blank, said tape and said strip each being of a length to have the ends thereof project away from said blank;
holding said ends of said tape and said film strip together to impart tension into the tape and film strip portions encircling said foot and rod blank;
subsequently curing said tape to secure said tape to said rod blank and said ends to each other; and
thereafter trimming said ends from said portions encircling said foot and rod blank.

14. A method as set forth in claim 13 which further comprises the step of removing said film strip after said step of curing.

15. A method as set forth in claim 13 wherein said tape is prepared by impregnating a cloth tape with a heat curable resin and drying the impregnated tape to a "B" stage condition.

16. A method as set forth in claim 13 wherein said tape is prepared by impregnating a cloth tape with a heat curable resin and partially curing the impregnated tape to a "B" stage condition.

17. A method as set forth in claim 13 wherein said tape is of a length longer than one revolution of wrap and less than two revolutions of wrap.

18. A method as set forth in claim 13 wherein a joint is formed in said tape on an opposite point of said rod blank from said foot during said trimming step.

19. A method as set forth in claim 13 wherein said tape is initially wound in a roll with said film strip as a release layer and a length of said roll is severed for application about said foot and rod blank.

* * * * *